United States Patent
Sinha et al.

(10) Patent No.: US 7,087,210 B2
(45) Date of Patent: Aug. 8, 2006

(54) SINGLE-STEP SIMPLE AND ECONOMICAL PROCESS FOR THE PREPARATION OF NANOSIZED ACICULAR MAGNETIC IRON OXIDE PARTICLES OF MAGHEMITE PHASE

(75) Inventors: Arvind Sinha, Jharkhand (IN); Jui Chakraborty, Jharkhand (IN); Venkatesh Rao, Jharkhand (IN)

(73) Assignee: Council of Scientific & Industrial Research, New Delhi (IN)

( * ) Notice: Subject to any disclaimer, the term of this patent is extended or adjusted under 35 U.S.C. 154(b) by 455 days.

(21) Appl. No.: 10/694,394

(22) Filed: Oct. 28, 2003

(65) Prior Publication Data

US 2004/0179997 A1    Sep. 16, 2004

(30) Foreign Application Priority Data

Oct. 30, 2002    (IN)    .................. 1094/DEL/2002

(51) Int. Cl.
*B05D 5/12*    (2006.01)
*C01G 49/02*    (2006.01)

(52) U.S. Cl. .................. 423/632; 977/811; 977/896
(58) Field of Classification Search ............... 423/632; 977/811, 896
See application file for complete search history.

(56) References Cited

U.S. PATENT DOCUMENTS 5,427,767 A    6/1995    Kresse et al.
6,123,920 A    9/2000    Gunther et al.
2003/0185748 A1*    10/2003    Sinha et al. ................ 423/632

OTHER PUBLICATIONS

Dr. R. Von Robl, "Über ferromagnetische Eisenoxyde", *Angew. Chem.*, Nr. 12, Jan. 7, 1958, pp. 367-371.
R. M. Taylor et al., "Maghemite in Soils and Its Origin", *Clay Minerals*, 1974, pp. 299-310.
Gautam R. Desiraju et al., "A Mild Transformation of γ-FeOOH to γ-$Fe_2O_3$ Using Organic Reagents", *Mat. Res. Bull*, vol. 17, 1982, pp. 443-449.
E. Ennas et al., "Characterization of nanocrystalline γ-$Fe_2O_3$ prepared by wet chemical method", *J. Mater. Res.*, vol. 14, No. 4, Apr. 1999, pp. 1570-1575.
K. E. Gonsalves et al., "Synthesis of acicular iron oxide nanoparticles and their dispersion in a polymer matrix", *Journal of Materials Science*, 2001, pp. 2461-2471.
C.V. Gopal, et al., "Preparation of γ-$Fe_2O_3$ by the hydrazine method Application as an alcohol sensor", *International Journal of Inorganic Materials*, 2000, pp. 301-307.

* cited by examiner

*Primary Examiner*—Steven Bos
*Assistant Examiner*—James Fiorito
(74) *Attorney, Agent, or Firm*—Foley & Lardner LLP

(57) ABSTRACT

The present invention relates to a single-step simple and economical process for the preparation of nanosized acicular magnetic iron oxide particles of maghemite phase of size ranging between 300–350 nm in magnetic field at room temperature by biomimetic route, and a method of obtaining a magnetic memory storage device using the said particles.

10 Claims, 1 Drawing Sheet

Figure 1A:

Fig. 1(a) Monodispersed acicular maghemite particles in the polymer matrix

Figure 1B:
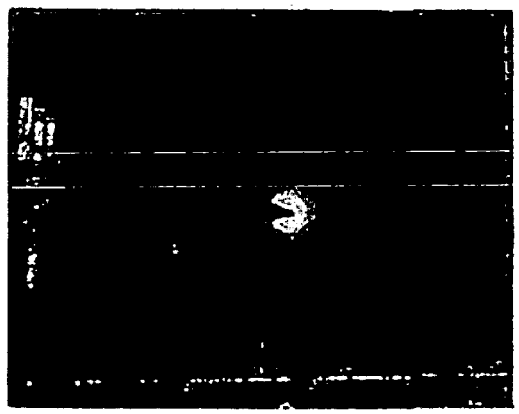

Fig. 1(b) SAD pattern corresponding to (440) and (313) planes of maghemite

SINGLE-STEP SIMPLE AND ECONOMICAL PROCESS FOR THE PREPARATION OF NANOSIZED ACICULAR MAGNETIC IRON OXIDE PARTICLES OF MAGHEMITE PHASE

FILED OF THE INVENTION

The present invention relates to a single-step simple and economical process for the preparation of nanosized acicular magnetic iron oxide particles of maghemite phase of size ranging between 300–350 nm in magnetic field at room temperature by biomimetic route, and a method of obtaining a magnetic memory storage device using the said particles.

BACKGROUND AND PRIOR ART REFERENCES OF THE PRESENT INVENTION

Magnetic pigments have been used in electronic recording devices since the late 1940's. The moderate cost of production and the chemical stability maghemite the principal magnetic pigment for the purpose. Though magnetite, another iron oxide, displays high magnetization and coercivity, it is less suitable for recording devices due to its magnetic instability.

Much of the art of creating a good magnetic medium lies in the preparation method of the pigment. New materials for magnetic recording may be limited by the superparamagnetic relaxation produced by the small size of the particle (<30 nm). Particle shape is also an important factor as it determines the shape anisotropy and then the coercive field value. For longitudinal magnetic recording, particles must show acicular shape.

The conventional route of synthesis of acicular maghemite particles through oxyhydroxide method is multistep and complicated. It becomes further difficult to produce nanosized maghemite particles through this process as a result of a poor control over the growth kinetics/in another method, oxidation of magnetite particles result in formation of either cubic or irregular maghemite particles. The crystals of <300 nm size are completely transformed to the maghemite phase at 200–250° C. Whereas, for larger crystals, the oxidation is incomplete. The process being single step, however, involves a relatively higher temperature to produce maghemite particles of negligible aspect ratio.

Reference may be made to R. Robl, Anges Chem. 1958, 70. pp. 367, wherein oxidation of ferrous sulphate solution was earned out with potassium nitrate followed by which the solution was heated to 60–80° C. and added sodium hydroxide solution slowly with continuous stirring. The black precipitate formed was washed and dried and was heated to 250° C. for 30 minutes leading to the formation of maghemite particles.

Reference may be made to R. M. Taylor and U. Schwertman, Clay Min. 1974; 10, pp. 299–310, wherein equal volumes of ferrous and ferric salt solutions were mixed and was heated to 40° C. To this was added the requisite amount of sodium hydroxide when a black precipitate was formed. This was filtered, washed, dried in air when the precipitate turned dark brown and was identified to be maghemite.

Reference may be made to Y. Maeda, The Electronics & Tele-Communication laboratories, NNT, E:C.L Techn. Publ., 1978, 179, pp 1–7, wherein-a solution of ferrous sulphate with sodium hydroxide leads to the formation of ferrous hydroxide. This was oxidized rapidly by passing air for 45 minutes with stirring which results in the formation of ferrous oxyhydroxide. This was again mixed with a solution of ferrous sulphate and iron wire was placed in the solution followed by which 8–10 litre air/minute was passed for 48 hours while maintaining the temperature at 60° C. The ferrous oxyhydroxide was separated from the solution, washed and dried at 130° C. and heated with hydrogen in a stirred autoclave at 440° C. until the magnetite content was 23.8%. After cooling to 250° C. air was passed in until the ferrous salt was absent.

Reference may be made to R. D. Gaulam and Madan Rao. Mater. Res. Bull. 1982, 17, pp. 443, wherein lepidocrocite is treated with pyridine and carefully oxidized for a long period for complete conversion to nanosized maghemite particles.

Reference may be made to G. Ennas, G. Marongm. A. Musinu. AiFalqw.-P. BalUrano and Camintin. J. Mater Res. 1999,14, pp.1570, wherein, through a wet chemical synthesis of successive hydrolysis, oxidation and dehydration of ferrous chloride was performed to obtain maghemite particles as small as 5 nm.

Reference may be made to G. V Gopal Reddy. Sheela Kalvana anil S. V Manorama, hit. J. Inorg. Mater, 2000, 2; pp.301, wherein synthesis of maghemite for sensor application through a novel technique of combustion of ferric salts with hydrazine hydrate has been carried out.

Reference may be made to K. E. Gonsalves, H. Li, and P. Santiago, J. Mattr. ScL 2001,36, pp. 2461, wherein lepidocrocite has been converted into maghemite by colloidal process in which the particles could be readily dispersed into an organic solvent. The as-prepared-acicular maghemite nanorod-ethanol dispersion containing 0.005 g nanorods was centrifuged. The supernatant solvent was decanted followed by the addition of 8.3 g of 6 wt % PMMA (polymethyl methacrylate) solution, and the mixture was sonicated for several hours in an ice-water cooling bath. The concentration of the magnetic maghemite nanorods was about 1% relative to the PMMA.

All the above processes are expensive and involve complicated steps.

Moreover, the maghemite particles produced have poor crystallinity mixed phase. Random variation in morphology low aspect ratio and magnetically induced agglomeration. The above limitations reduce the applicability the magnetic pigments in the field of magnetic information storage.

Reference may be made to Wolfgang H. H. Gunther et al. U.S. Pat. No. 6,123,920. dated Sep. 26, 2000, entitled "Superparamagnetic contrast media coated with starch and polyalkylene oxides wherein MR contrast media containing composite nanoparticles, preferably comprising a superparamagnetic iron oxide (magnetite) core provided with a coating comprising an oxidatively cleaved starch coating optionally together with a functionalized polyalkyleneoxide serves to prolong blood residence.

Reference may be made to Kresse et al. U.S. Pat. No. "57,427,767. dated Jun. 27, 1995. entitled "Nanocrystalline magnetic iron oxide" particles-method for preparation and use in medical diagnostics and therapy" wherein nanocrystalline magnetic particles consisting of genetic nanocrystalline magnetic particles consisting of genetic iron oxide core of $Fe_3O_4$. $gamma-Fe_2O_3$ or mixtures thereof and an envelope chemisorbed to said core, the method for preparation of these particles as well as the use thereof in medical diagnostics and/or therapy.

The magnetic particles, according to the invention, are characterized by composition of the coating material of natural or synthetic glycosaminoglycans and/or their derivatives with molecular weights of 5(X) Da to 250.000 Da. if necessary covalently cross-linked with appropriate cross-linking agents and/or modified by specific additives, oxide core of $Fe_3O_4$, $gamma-Fe_2O_3$ or mixtures thereof and an envelope chemisorbed to said core, the method for preparation of these particles as well as the use thereof in medical diagnostics and/or therapy. The magnetic particles, according to the invention, are characterized by composition of the coating material of natural or synthetic glycosaminoglycans and/or their derivatives with molecular weights of 500 Da to 250,000 Da, if necessary covalently cross-linked with appropriate cross-linking agents and/or modified by specific additives.

As is evident from the above mentioned recent references from US patents, superparamagnetic iron oxide (both magnetite and maghemite phases) have been used in the medical diagnostics and therapeutic uses. No evidence so far has been obtained regarding the synthesis of acicular shaped maghemite particles for the use in information storage (US patent Search), following biomimetic route.

Since the evolution of life, synthesis of nano and microsized inorganic particles is observed in nature. Under the control of a biopolymeric matrix, the in situ synthesis of these inorganic minerals exhibit a precise control over their nucleation and growth which result in precipitation of agglomeration free particles. Our teeth, bone, shells are some of the common products of biomineralisation in nature.

OBJECTS OF THE PRESENT INVENTION

The main object of the present invention is to provide a process for the preparation of nanosized acicular magnetic iron oxide in magnetic field by biomimetic cute which obviates the drawbacks as detailed above.

Another object of the present invention is to provide a single step process for reparation of nanosized acicular maghemite particles induced by magnetic field following a room temperature biomimetic process.

Another object of the present invention relates to a single-step simple and economical process for the preparation of nanosized acicular magnetic iron oxide particles of maghemite phase of size ranging between 300–350 nm in magnetic field at room temperature by biomimetic route.

Another object of the present invention is to identify the optimal ratio of ferric chloride and ferrous chloride salts in the particular ratio to obtain the said particles.

Another object of the present invention is to develop the said particles as free of agglomeration.

Yet another object of the present invention is to develop a method of obtaining a magnetic memory storage device using nanosized acicular magnetic iron oxide particles of maghemite phase.

SUMMARY OF THE PRESENT INVENTION

The present invention relates to a single-step simple and economical process for the preparation of nanosized acicular magnetic iron oxide particles of maghemite phase of size ranging between 300–350 nm in magnetic field at room temperature by biomimetic route, and a method of obtaining a magnetic memory storage device using the said particles.

DETAILED DESCRIPTION OF THE PRESENT INVENTION

The present invention relates to a single-step simple and economical process for the preparation of nanosized acicular magnetic iron oxide particles of maghemite phase of size ranging between 300–350 nm in magnetic field at room temperature by biomimetic route, and a method of obtaining a magnetic memory storage device using the said particles.

A single-step simple and economical process for the preparation of nanosized acicular magnetic iron oxide particles of maghemite phase of size ranging between 300-350 nm in magnetic field at room temperature by biomimetic route, said process comprising steps of:

a) mixing polyvinyl alcohol solution of strength ranging between 0.1 to 0.6% and iron salt solution of strength ranging between 0.1–0.15% in a volumetric ratio ranging between 3.1 to 5:2 at a pH in the range of 2–5 and stirring for about 20 minutes by a magnetic stirrer, b) heating the resultant solution at a temperature in the range of 30°–60° C. for about 24 hours in an oven under nitrogen atmosphere to obtain an iron ion loaded polymer gel, c) soaking the above said polymer gel for a period ranging from 4–6 minutes into sodium hydroxide solution of strength ranging between 2–2.5 M at a temperature ranging from 30° C.–50° C. under an external magnetic field ranging-between 800–1500 Gauss, d) washing the above soaked polymer gel with deionized water to remove the sodium chloride salt and drying at a temperature ranging between 30° C.–60° C. under nitrogen atmosphere for about 24 hours, and e) recovering the 100% acicular maghemite particles from the dried polymer gel by known method Yet another embodiment of the present invention, the iron salt solution is prepared by dissolving ferric chloride and ferrous chloride salts in the ratio of 2:1 to 4:3 in deionized water.

Still another embodiment of the present invention, the polyvinyl alcohol is of strength preferably about 0.5%.

Yet another embodiment of the present invention, the volumetric ratio of alcohol and iron salt solution is preferably 4:1.

Still another embodiment of the present invention, the pH is preferably about 3.

Yet another embodiment of the present invention, the solution is heated at temperature preferably about 40° C.

Still another embodiment of the present invention, the sodium hydroxide is of strength preferably about 2.05M.

Yet another embodiment of the present invention, the particles are free of agglomeration free.

Still another embodiment of the present invention, particles are high aspect maghemite particles.

Yet another embodiment of the present invention, the particles have high particle density/unit area.

One more embodiment of the present invention, a method of obtaining a magnetic memory storage device using nanosized acicular magnetic iron oxide particles of maghemite phase, said method comprising step of covering a flexible disk with a thin layer of the said iron oxide, casing the covered-disk with a protective material, and obtaining the magnetic memory storage device.

Yet another embodiment of the present invention, wherein the protective material is plastic.

In the process of present invention a method has been developed for in situ, precipitation of uniformly acicular, single-phase maghemite particles having a high aspect ratio in a pre-organized water-soluble polymer matrix polyvinyl alcohol, held at room temperature and atmospheric pressure. The method produced maghenemite particles in the size range of 300–350 nm having uniform morphology, orientation and a high aspect ratio. The SAD Pattern corresponding to (440) and (313) planes of maghemite is shown in FIG. 1(b).

Under the optimum conditions of temperature, concentration. pH and a specific relative volumetric ratio, the underlying polymeric matrix provides a regularly arranged and uniformly distributed reaction as well as nucleation sites in the self assembled polymeric network formed as a result of gelation. An optimum external magnetic field not only exerts a high degree of control over the growth epitaxy and orientation of the particles immobilized by the pre-organized matrix but also induces the nucleation of maghemite phase having tetragonal unit cell instead of magnetite phase with cubic unit cell. Moreover, the polymer matrix anisotropy also provides a specific orientation during the particle growth.

In an embodiment of the present invention, the iron salt solution may be prepared by dissolving ferric chloride and ferrous chloride salt in the ratio of 2:1 to 4:3 in deionised water.

In another embodiment of the present invention, the chemicals used may be of analytical grade.

By the process of the present invention single phase agglomeration freer, oriented acicular maghemite particles in the size range of 300–350 nm with a high aspect ratio is produced {FIG. 1(a)}.

The novelty of the present route lies m the single step biomimetic synthesis of monodispersed high aspect ratio maghemite particles in presence of an applied magnetic field. Magnetic field, an external stimulus in this process pertaining to the nucleation of maghemite instead of magnetite, also induces directional growth leading to anisotropy.

In the present invention based on the principle of biomimetics under an external stimuli, the microenvironment of the polymer matrix characterized by a regular arrangement of functional sites leads to an uniformly epitaxial growth of maghemite particles in a preferred crystallographic orientation induced by an optimum external magnetic field. The magnetic field is supposed to provide the necessary activation energy for the nucleation of the maghemite phase.

The following examples are given by way of illustration and should not be construed to limit the scope of the present invention.

BRIEF DESCRIPTION OF THE ACCOMPANYING DRAWINGS

FIG. 1(a) shows mono-dispersed acicular maghemite particles in the polymer matrix FIG. 1(b) shows SAD Pattern corresponding to (440) and (313) planes of maghemite.

EXAMPLE-1

60 ml of 0.5% polyvinyl alcohol solution was mixed with 5 ml-of 0.144 M iron salt solution in the volumetric ratio of 4:1 by continuous stirring using a magnetic stirrer. The pH of the solution was maintained at 3. The resulting solution was poured into a Petridish and subjected to gel formation in an oven at 40° C. under nitrogen atmosphere for 24 hours. Next the dried yellow thin film was soaked for a period of 2 hours in 2.05 M sodium hydroxide solution taken in a beaker and heated to 40*C. following—which the colour of the-film changed from yellow to black. This was washed 4–5 times with deionised water and dried in the same oven at 50° C. under nitrogen atmosphere for 24 hours. The film was structurally characterized by X-ray diffraction scanning electron microscopy and transmission electron microscopy. The analysis of the results obtained confirmed the formation of single phase, monodispersed and regularly oriented magnetite particles having cuboid, spheroid or cubooctahedral geometry. The particle size in this case was observed to be in the order of 80-) 00 nm, showing agglomeration to a certain extent The recovery of these iron oxide particles were close to 100%.

EXAMPLE-2

50 ml of 0.5% polyvinyl alcohol solution was mixed with 1.5 ml of 0.144 M iron salt solution in the volumetric ratio of 4:1 by continuous stirring using a magnetic stirrer. The pH of the solution was maintained at 3. The resulting solution was poured into a Petridish and subjected to gel formation in an oven at 40° C. under nitrogen atmosphere for 24 hours. Next, the dried yellow thin film was soaked under an applied magnetic field of 890 Gauss for 5 minutes in 2.03 M sodium hydroxide solution taken in a beaker and heated to 40° C., following which the colour of the film changed from yellow to dark brown. The magnetic field was removed, the sample taken out and washed with deionised water 4–5 times and dried in the same oven under nitrogen atmosphere at 30° C. for 24 hours.

Next the film was structurally characterized by X-ray diffraction, scanning electron microscopy and transmission electron microscopy. The analysis of the data indicated the presence of both the magnetite and the maghemite phases with a low particle density/unit area and almost without any agglomeration. The maghemite particles were oriented, having acicular morphology with a medium aspect ratio and were in the size range of 200–300 nm. The magnetite particles have irregular, spheroid or cubooctahedral geometry and were in the size range of 100–200 nm. The recovery of the maghemite particles were close to 70% whereas the recovery of the magnetite particles was close to 30%.

EXAMPLE-3

60 ml of 0.5% polyvinyl vinyl alcohol solution was mixed with 15 ml of 0.144 M iron salt solution in the volumetric ratio of 4:1 by continuous stirring using a magnetic stirrer. The pH of the solution was maintained at 3 The resulting solution was poured into a Petridish and subjected to gel formation in an oven at 40° C. under nitrogen atmosphere for 24 hours. Next, die dried yellow thin film was soaked under an applied magnetic field of 1000 Gauss for 5 minutes in 2.05 M sodium hydroxide solution taken in a beaker and heated to 40° C., following which the colour of the film changed from yellow to dark brown.

The magnetic field was removed, the sample taken out and washed with deionised water 4–5 times and dried in an oven under nitrogen atmosphere at 50° C. for 24 hours. Next, the film was structurally characterized by X-ray diffraction, scanning electron microscopy and transmission electron microscopy. The analysis of the data indicated the presence of single phase maghemite particles having a high particle density/unit area but with a mixed geometry of acicular (in the size range of 250–300 nm), spindle shaped and spheroid particles (in the size range of 50–100 nm). The particles in general were oriented, agglomeration free and the acicular maghemite particles have a high aspect ratio. The recovery of these iron oxide particles were close to 100%.

EXAMPLE-4

60 ml of 0.5% polyvinyl alcohol solution was mixed with 15 ml of 0.144 M iron salt solution in the volumetric ratio of 4:1 by continuous stirring using a magnetic stirrer. The pH of the solution was maintained at 3 The resulting solution was poured into a Petridish and subjected to gel formation in an oven at 40° C. under nitrogen atmosphere for 24 hours. Next, the dried yellow thin film was soaked under an applied magnetic field of 1175 Gauss for 5 minutes in 2.05 M sodium hydroxide solution taken in a beaker and heated to 40° C., following which the colour of the film changed from yellow to dark brown. The magnetic field was removed, the sample taken out and washed with deionised water 4–5 times and dried in an oven under nitrogen atmosphere at 50°C. for 24 hours. Next the film was structurally characterized by X-ray diffraction, scanning electron microscopy and transmission electron microscopy.

The analysis of the data indicated the presence of single phase, monodispersed maghemite particles in the size range of 300–350 run having oriented, acicular morphology with a very high aspect ratio and a high particle density/unit area. The particles were completely agglomeration free. The recovery of these iron oxide particles were close to 100%.

Keeping other reaction parameters constant die rate of reaction in any process depends largely on the orientation of the reacting molecules for an effective collision to overcome the energy barrier for the forward reaction. In the present case, the precipitated iron oxide particles being magnetic, the applied external magnetic field confers a high degree of orientation in the colliding molecules to increase the probability of the effective collisions for a successful chemical transformation as has-been-referred in the Arrhenius equation for the ratio of reaction.

As evident from the present experimental results, an optimum external magnetic field provides the necessary threshold energy (activation energy) and increases die frequency of die effective collisions greatly for the nucleation and precipitation of the maghemite particles. As observed, a lower field results in an incomplete chemical transformation resulting in mixed products leading to precipitation '<<f both magnetite and maghemite phases or a mixed geometry of acicular as well as spheroid and cubooctahedral particles.

This invention relates to a process for the preparation of nanosized magnetic iron oxide in magnetic field by biomimetic route. This invention particularly relates to a single step biomimetic route for the preparation of nanosized acicular maghemite in magnetic field, which is used for the magnetic memory storage. The nanosized acicular maghemite particles, a form of iron oxide, in the range of 300–350 nm in size will be suitable as a particulate medium for perpendicular magnetic recording in general and in audio/video tapes in particular.

The Main Advantages of the Present Invention Ore:

The invention provides a room temperature single step process for the preparation of nanosized uniformly acicular maghemite particles with a high aspect ratio for application in the field of magnetic memory storage.

The invention lea Is to precipitation of agglomeration free maghemite particles having uniform shape and size.

The invention claimed is:

1. A process for the preparation of nanosized acicular magnetic iron oxide particles of maghemite phase of size ranging between 300–350 nm in magnetic field at room temperature by biomimetic route, said process comprising steps of:
   a) mixing polyvinyl alcohol solution of strength ranging between 0.1 to 0.6% and iron salt solution of strength ranging between 0.1–0.15% in a volumetric ratio ranging between 3.1 to 5:2 at a pH in the range of 2–5 and stirring for about 20 minutes by a magnetic stirrer,
   b) heating the resultant solution at a temperature in the range of 30°–60° C. for about 24 hours in an oven under nitrogen atmosphere to obtain an iron ion loaded polymer gel,
   c) soaking the above said polymer gel for a period ranging from 4–6 minutes into sodium hydroxide solution of strength ranging between 2–2.5 M at a temperature ranging from 30° C.–50° C. under an external magnetic field ranging between 800–1500 Gauss,
   d) washing the above soaked polymer gel with deionized water to remove the sodium chloride salt and drying at a temperature ranging between 30° C.–60° C. under nitrogen atmosphere for about 24 hours, and
   e) recovering the 100% acicular maghemite particles from the dried polymer gel.

2. A process as claimed in claim 1, wherein the iron salt solution is prepared by dissolving ferric chloride and ferrous chloride salts in the ratio of 2:1 to 4:3 in deionized water.

3. A process as claimed in claim 1, wherein the polyvinyl alcohol is of strength preferably about 0.5%.

4. A process as claimed in claim 1, wherein the volumetric ratio of alcohol and iron salt solution is preferably 4:1.

5. A process as claimed in claim 1, wherein the pH is preferably about 3.

6. A process as claimed in claim 1, wherein the solution is heated at temperature preferably about 40° C.

7. A process as claimed in claim 1, wherein the sodium hydroxide is of strength preferably about 2.05M.

8. A process as claimed in claim 1, wherein the particles are free of agglomeration.

9. A process as claimed in claim 1, wherein particles are high aspect maghemite particles.

10. A process as claimed in claim 1, wherein the particles have high particle density/unit area.

* * * * *